United States Patent [19]

Airheart et al.

[11] 4,159,754

[45] Jul. 3, 1979

[54] PARKING BRAKE ASSEMBLY

[75] Inventors: Franklin B. Airheart, Sylmar; Emilio L. Agarpao, Northridge, both of Calif.

[73] Assignee: Airheart Products, Inc., Chatsworth, Calif.

[21] Appl. No.: 857,385

[22] Filed: Dec. 5, 1977

[51] Int. Cl.² ............................................. F16D 65/52
[52] U.S. Cl. ................... 188/71.8; 188/72.6; 188/72.7; 188/106 F; 188/196 C; 192/70.23; 192/70.25; 192/111 A
[58] Field of Search ............... 188/106 F, 72.6, 72.7, 188/71.8, 196 P, 196 B, 196 C; 192/70.23, 70.25, 111 A

[56] References Cited

U.S. PATENT DOCUMENTS

| 2,187,636 | 1/1940 | Story | 192/111 A X |
|---|---|---|---|
| 3,404,756 | 10/1968 | Swift | 188/106 F |
| 3,459,282 | 8/1969 | Hoenick et al. | 188/71.8 X |
| 3,605,959 | 9/1971 | Beck | 188/196 P |
| 3,805,924 | 4/1974 | Gambardella | 188/106 F X |

FOREIGN PATENT DOCUMENTS 2400470  7/1974  Fed. Rep. of Germany .......... 188/71.8

*Primary Examiner*—George E. A. Halvosa
*Attorney, Agent, or Firm*—William W. Haefliger

[57] ABSTRACT

A braking assembly includes a carrier for a hydraulically actuated braking piston; a shaft movable axially to also displace the piston, a rotary actuator member, and a coupling responsive to rotation of the rotary member to effect advancement of the shaft toward the piston, accompanied by gripping of the shaft.

15 Claims, 8 Drawing Figures

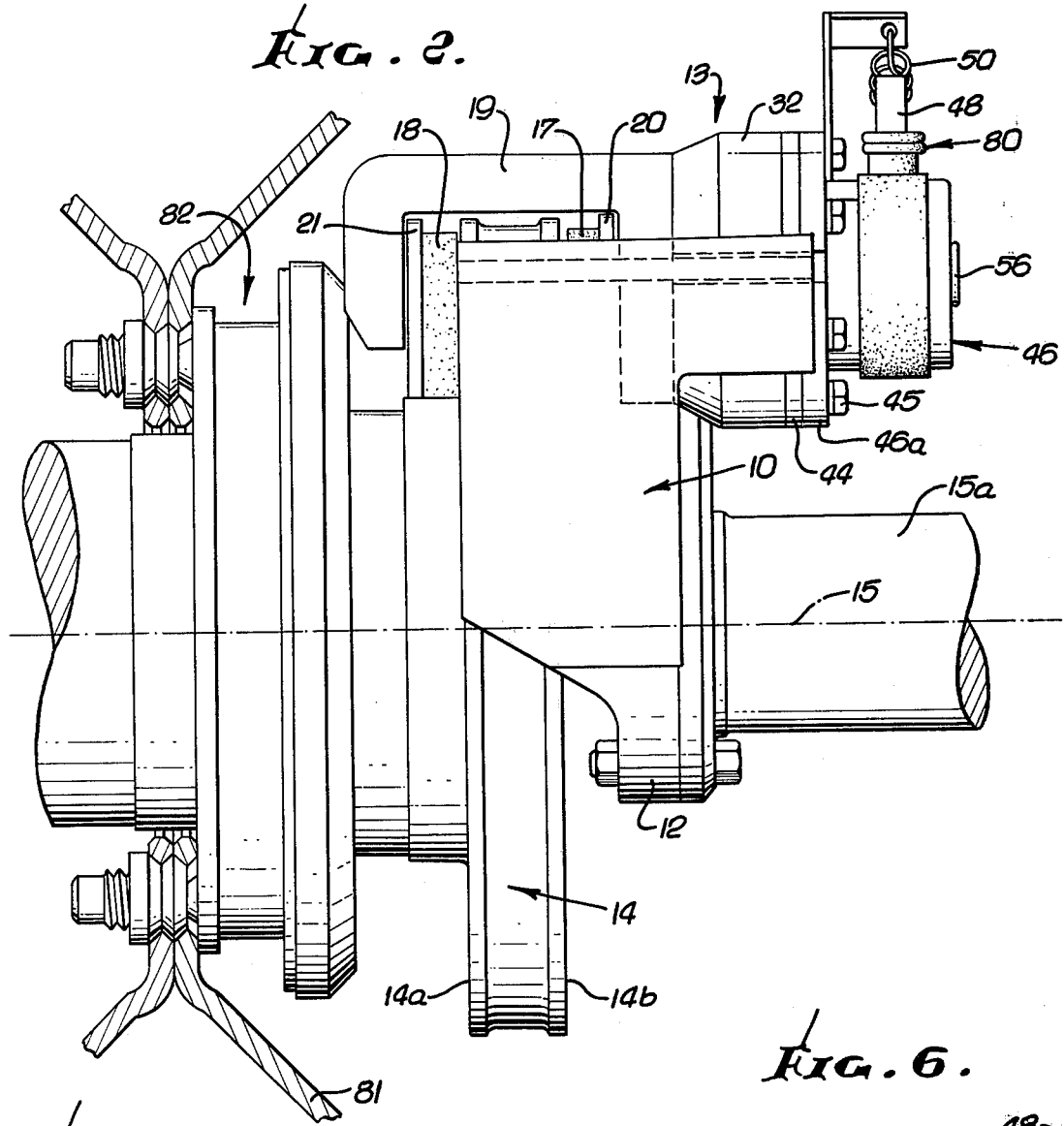
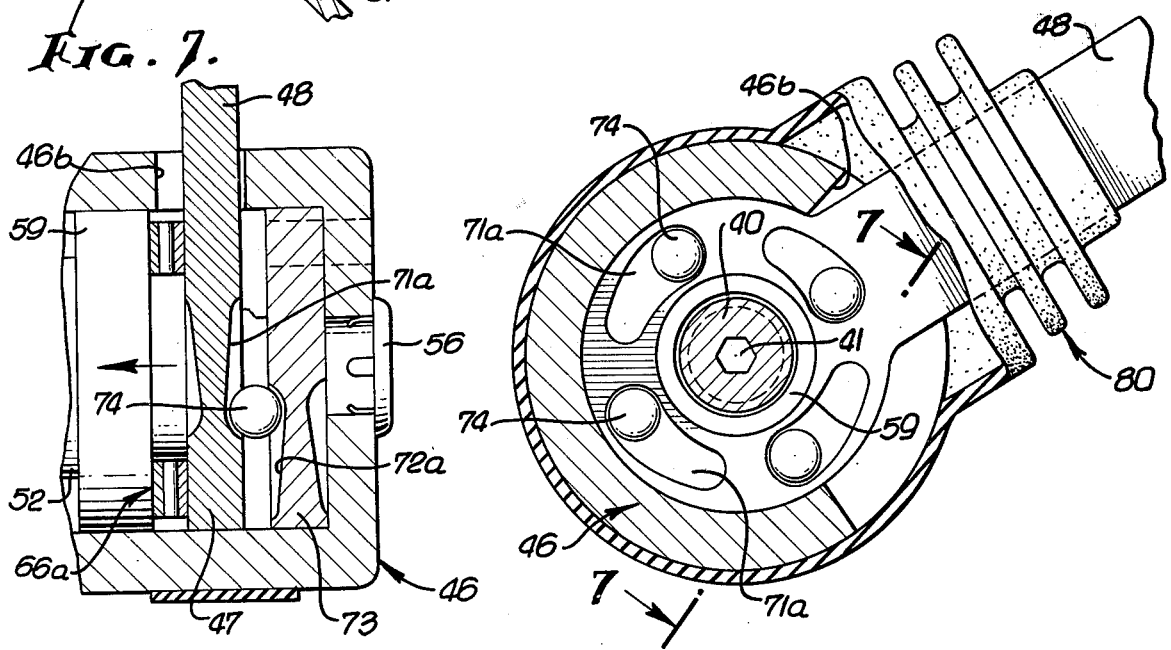

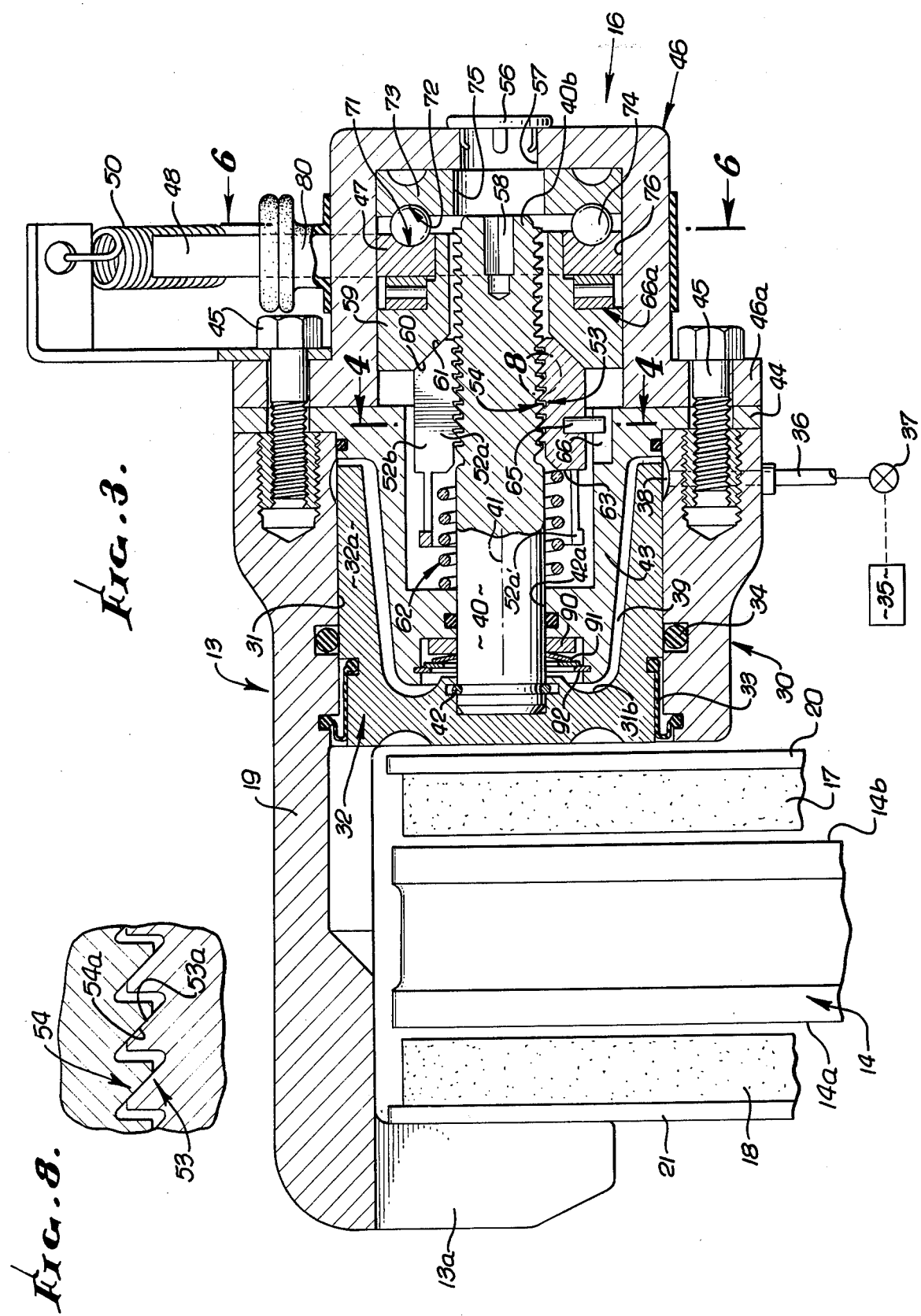

PARKING BRAKE ASSEMBLY

BACKGROUND OF THE INVENTION

This invention relates generally to disc brakes, although it has wider application; more particularly, it concerns the solution of problems that arise in systems wherein both hydraulic and mechanical actuation of brakes is desired. Mechanical braking in such instances is otherwise referred to as "parking" braking, as conventionally used for vehicles.

The problems referred to above may arise from lack of brake actuation and release sensitivity, lack of simplicity and reliability, difficulty with providing for wear adjustment of the brake where both hydraulic and mechanical actuation are integrated; and lack of compactness as is desired for smaller vehicles. Other problems also exist in prior designs.

SUMMARY OF THE INVENTION

It is a major object of the invention to provide a solution or solutions to the above as well as associated problems encountered in braking systems. Fundamentally, the invention is embodied in braking assembly that includes:

(a) a carrier having a bore, and a piston slidable axially in the bore to transmit force of fluid pressure acting on the piston to a brake pad, (b) a shaft extending axially to transmit auxiliary thrust to the piston, (c) a rotary actuator member rotatable about said axis, and (d) coupling means responsive to rotation of said member in one direction to effect axial advancement of the shaft toward the piston accompanied by gripping of the shaft, and responsive to rotation of said member in the opposite direction to allow axial retraction of the shaft.

Further, the coupling means advantageously includes a collet having spring fingers spaced about the shaft, the fingers and shaft having mutually engageable elements to effect the shaft advancement in response to radially inward displacement of the fingers; the shaft element to be gripped by the fingers typically comprises a Buttress type thread with a flank angled to be cammed toward the piston as the fingers move inwardly; the thread allows the shaft to be adjustably rotated to adjust the piston position relative to brake pads, to allow brake pad replacement; a grip ring and Belleville spring combination acts to retract the shaft and also to allow adjustment of the shaft toward the piston and relative to the grip ring when brake pad wear is compensated for.

Also, the coupling means typically includes a part located between the rotary actuator and the collet to transmit force therebetween, that part defining a conical recess, and the spring fingers have nose portions fitting in the recess to be cammed toward the shaft thread when the actuator member is rotated; the coupling means includes ramp structure and pusher bearing means operable to push the actuator member toward the part referred to in response to actuator member rotation; and the actuator member typically includes a crank that projects exteriorly of a carrier cap or housing to be displaced as by a hand brake cable.

These and other objects and advantages of the invention, as well as the details of an illustrative embodiment, will be more fully understood from the following description and drawings, in which:

DRAWING DESCRIPTION

FIG. 2 is a left end elevation of the FIG. 1 structure;

FIG. 3 is an enlarged section on lines 3—3 of FIG. 1;

FIG. 6 is a section on lines 6—6 of FIG. 3;

FIG. 7 is a section on lines 7—7 of FIG. 6; and

FIG. 8 is a section showing the threaded portions of the adjuster.

DETAILED DESCRIPTION

Figure 1:
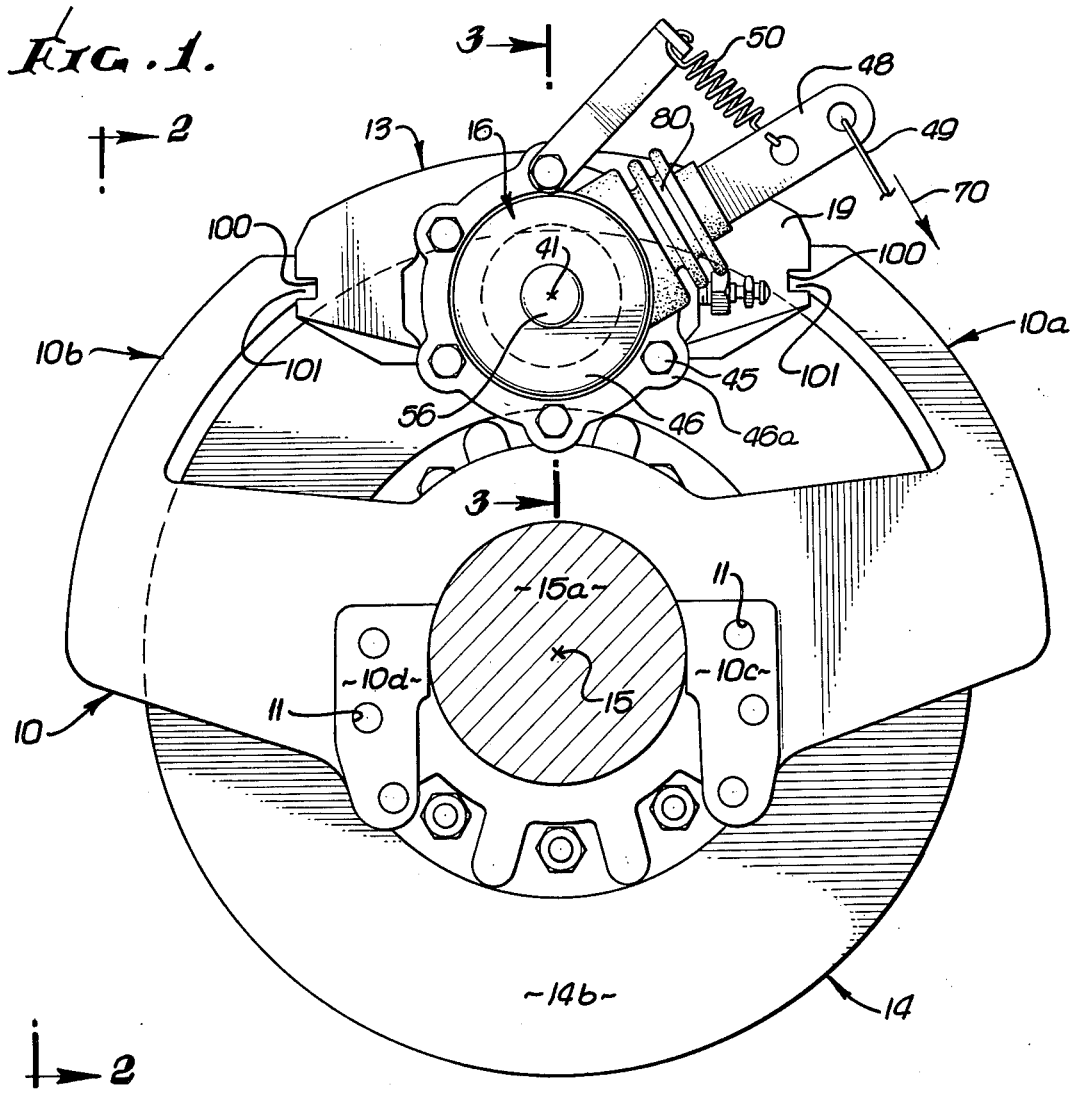
FIG. 1 is a side elevation showing disc brake structure incorporating one preferred form of the invention.
Figure 4:
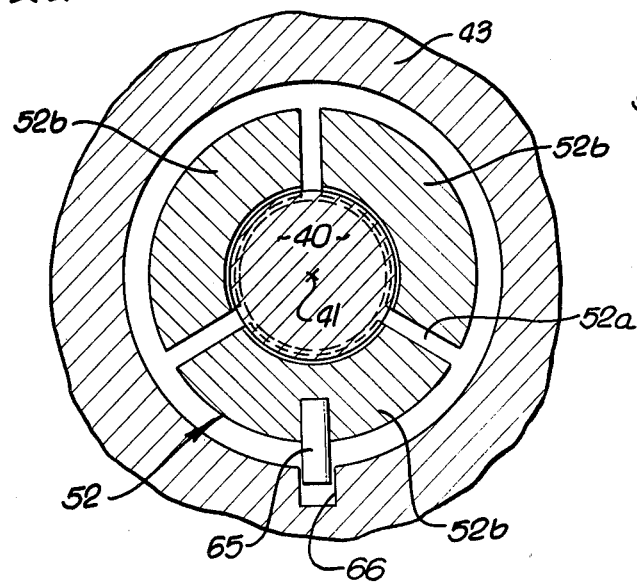
FIG. 4 is a section taken on lines 4—4 of FIG. 3.
Figure 5:
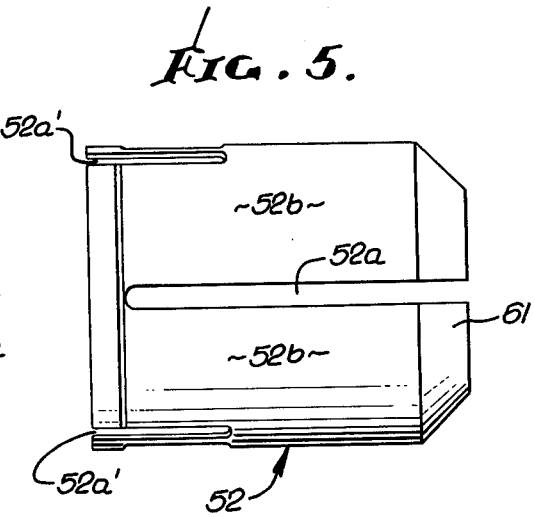
FIG. 5 is a side elevation of an adjuster collet as also seen in FIG. 3.

In the drawings, a torque arm 10 includes extents 10a and 10b projecting oppositely from portions 10c and 10d adapted to be bolted, via drilled openings 11, to axle flange 12. The torque arm extents 10a and 10b support a caliper assembly 13 straddling the disc 14, which has opposite sides or faces 14a and 14b. Disc 14 rotates about axis 15 relative to the caliper assembly, the latter carrying an actuator 16 for urging brake pad 17 against one side 14b of the disc. The caliper brake pad 18 is carried at the opposite side of the disc to engage and brake that side 14a in response to operation of the actuator, and reaction shifting of the caliper body 19 parallel to axis 15 of axle 15a. Guideways 100 on body 19 receive tongues 101 on torque arm extents 10a and 10b, to accommodate such shifting.

The pads 17 and 18 are respectively carried by plates 20 and 21 suitably carried for axial shifting in response to braking and caliper reaction shifting.

Extending the description to FIG. 3, the brake assembly embodied in the actuator 16 includes a carrier; which may comprise a housing 30 intergral with the caliper 13. The carrier has a bore 31, and a piston 32 is movable axially in the bore to transmit force of fluid pressure acting on the piston to the brake pad 17, as via plate 20, for example. Piston skirt 32a is slidable in bore 31, and an annular dust seal 33 is provided between the piston and the bore; also an 0-ring seal is provided at 34. Pressurized hydraulic fluid from a source 35 is conducted at 36, via valve 37, to plenum chamber 38, from which pressure is delivered to the piston chamber 39 for exertion on piston face 31b to advance the piston leftwardly.

The assembly also includes a shaft 40 extending coaxially with the piston, their common axis being shown at 41. A connector ring rotatably attaches the shaft to the piston at 42, and a guide bore 42a in annular mount 43 guides the shaft for leftward and rightward displacement. In this regard, and as will be seen, the shaft functions to transmit auxiliary thrust to the piston, as during mechanical or auxiliary braking (for example during parking). Mount 43 is integrally attached to the carrier; for example a machine screw 45 may clamp a flange 44 on the mount between the right end of the housing 30, and a flange 46a on a cap 46. The elements 30, 43 and 46 may be considered as embodied in the carrier, which is integral with the caliper 13. Note caliper arm 13a at the side of the disc 14 opposite from the piston.

Further in accordance with the invention, ramp means is carried by the carrier; pusher bearing means is engageable with the ramp means; and an actuator member is provided to be rotatable about axis 41 and is operatively coupled to the pusher bearing means to displace the pusher bearing means along the ramp causing the shaft to be gripped and displaced axially for transmitting auxiliary force to the piston in response to rotation of the actuating member about axis 41. Such structure may be considered as one form of coupling means responsive to rotation of the actuator member in one direction to effect axial advancement of the shaft toward the piston, and responsive to rotation of the member in the opposite direction to allow axial retraction of the shaft.

In the illustrated embodiment, the actuating member may comprise, for example, rotor 47 turnable about axis 41 by arm 48 projecting exteriorly of the cap 46. Mechanical braking force may be transmitted to the arm, as by cable 49 shown in FIG. 1, and a return spring 50 may be attached to the arm to return it to non-actuated position, i.e. in which no auxiliary braking force is to be transmitted to the piston 32.

The coupling means may with unusual advantage include a collet 52 which is axially split at circumferentially spaced locations, to define circumferentially spaced, axially projecting spring fingers 52b. The latter may define jaws, as shown, and the jaws and shaft have mutually engageable elements to effect the described axial advancement of the shaft in response to radially inward displacement of the spring fingers or jaws. In this regard, the shaft element may comprise a Buttress type thread 53, with a spiral flank 53a angled radially inwardly to define a cam surface. The spring finger element or elements have a corresponding thread at 54 with a flank or flanks 54a facing toward the piston, and angled in the same manner as flank 53a, to define a cam surface. Accordingly, it can be seen that as the spring fingers or jaws are displaced radially inwardly, the flank 54a slides on flank 53a, urging the latter and shaft 40 leftwardly, to advance the piston toward the brake pads and disc 14. Collet splits appear at 52a and 52a'.

It will also be seen that this construction allows rotation of the shaft 40 about axis 41, for adjustment purposes, i.e. to move the piston away from the braking disc, to allow for replacement of the brake pads. For this purpose, the shaft has an end portion 40b remote from the piston, and to which access may be had for rotating the latter. Note that a plug 56 is removable from an end opening 57 in the cap 46, to allow insertion of a tool such as a hex-headed wrench into hex-opening 58 in the end of the shaft, to rotate same. The coupling of the shaft to the piston at or by ring 42 allows rotation of the shaft relative to the piston.

The illustrated coupling means between member 47 and shaft 40 also includes an annular part 59 located between the member 47 and the collet to transmit force between them. Part 59 defines a frusto-conical shoulder 60 about a frusto-conical recess that receives the nose portions of the collet jaws 52b, whereby the tapered cam surfaces 61 on those nose portions are engageable with shoulder 60. A compression spring 62 urges the collet toward part 59 to maintain cam surfaces 61 in engagement with cam shoulder 60. One end of spring 62 bears against an internal shoulder defined by fixed mount 43, and the opposite end of the spring bears against the collet shoulder 63, as shown. As a result, when part 59 is moved leftwardly by the actuator member 47, the spring fingers are caused to move radially inwardly to increasingly grip the shaft. Also, the spring allows the jaws to ratchet over the thread, leftwardly, in case of wear of the brake pads.

A key 65 extending between a jaw 52b and a keyway 66 in mount 43 blocks rotation of the collet; and part 59 may also be considered s non-rotary. A thrust bearing 66a between part 59 and rotary member 47 accommodates rotation of the latter.

The coupling means advantageously includes ramp means, and pusher bearing means engageable with the ramp means to effect axial displacement of the part 59 toward the collet in response to rotation of the actuator member 47 in one rotary direction, i.e. the direction of arrow 70 in FIG. 1. As illustrated, the ramp means may advantageously include first ramp means 71 in the actuator member, and second ramp means 72 on an annular part 73 axially spaced from member 47, the pusher bearing means comprising bearing balls 74. Part 73 is confined by cap 46, in FIG. 3, and defines a central opening 75 in alignment with the shaft. As further shown in FIGS. 6 and 7, the first ramp means includes multiple ramps 71a circularly spaced about axis 41, and tapering radially and axially, as well as circularly, in one direction about that axis. The second ramp means includes multiple ramps 72a, similar to ramps 71a, circularly spaced about axis 41, and also tapering radially and axially, as well as circularly, but in the opposite direction about that axis. As a result, when the actuator member is rotated, the ramps 71a are rotated relative to ramps 72a, and the balls ride up both ramps, to displace member 47 axially leftwardly, part 59 also being displaced in that direction. Cap 46 provides a guide bore 76 to guide the peripheries of the member 47 and part 59 during their sliding movement. Spring 62 acts to urge the elements 52, 59, 47, 74 and 73 into closely axially stacked or assembled relation, as shown in FIG. 3.

FIG. 3 also shows the provision of a grip ring 90 on the shaft 40 and having interference fit with same. A Belleville spring 91 bears against the ring to resist leftward advancement of the ring and shaft, for retracting same when the brake is released. Keeper ring 92 blocks displacement of the Belleville spring, and blocks the ring 90 when the shaft is sufficiently displaced, so that the shaft may adjustably shift automatically to compensate for brake wear.

A rubber boot 80 extends about the crank arm 48, and seals off between the latter and the periphery of cap 46. An opening 46a in the wall of cap 46 loosely passes arm 48 and allows its rotation about axis 41, as well as axial displacement with member 47.

In FIG. 2, disc 14 may be integral with structure 80 to which a vehicle wheel 81 is suitably attached.

In operation, rotation of member 47 in a braking direction causes leftward movement of part 59 which acts to:

(1) deflect spring finger jaws 52b inwardly, thereby camming the shaft 40 leftwardly, (2) deflect collet 52 leftwardly, thereby displacing shaft 40 leftwardly, (3) compress spring 62, (4) compress Belleville spring 91.

When member 47 is released, spring 50 returns crank 48 in a brake release direction, part 59 moves rightwardly, and jaws 52b move outwardly. Belleville spring 91 immediately urges the shaft rightwardly, for sensitive and rapid brake release. Also, spring 62 urges collet 52 rightwardly, along with part 59 and member 47, as the latter rotates. Balls 74 also roll down their respective ramps.

Accordingly, heightened brake actuation and release sensitivity is achieved, in a simple, effective manner.

The invention is applicable to brakes other than disc brake systems.

We claim:
1. In a brake assembly, the combination comprising
   (a) a carrier having a bore, and a piston slidable axially in the bore to transmit force of fluid pressure acting on the piston to a brake pad,
   (b) a shaft having an axis extending axially to transmit auxiliary thrust to the piston,
   (c) a rotary actuator member rotatable about said axis, and
   (d) coupling means responsive to rotation of said member in one direction to effect axial advancement of the shaft toward the piston accompanied by gripping of the shaft, and responsive to rotation of said member in the opposite direction to allow retraction of the shaft, said coupling means including a collet having spring fingers spaced about the shaft, the collet and shaft having mutually engageable elements to effect said axial advancement of the shaft in response to radially inward displacement of said spring fingers, said shaft element comprising a screw thread,
   (e) the rotary actuator member extending about the shaft axis and having a central opening extending axially therethrough, the shaft being in alignment with said central opening and having an end portion remote from the piston and to which access may be had for adjustably rotating the shaft relative to the collet, the shaft also having an end portion proximate the piston and rotatably coupled thereto to allow shaft rotation relative to the piston.

2. The combination of claim 1 wherein said shaft element comprises a Buttress type thread with a flank angled radially inwardly, said spring fingers having cam engagement with said flank to advance the shaft as the spring fingers are radially inwardly displaced.

3. The assembly of claim 1 wherein the coupling means includes a part located between the rotary actuator member and the collet to transmit force therebetween, said part defining a frusto-conical recess, and the collet spring fingers having nose portions fitting in said recess with camming engagement with said part, there being a spring urging the collet axially toward said recess, whereby the collet spring fingers are caused to move radially inwardly to increasingly grip the shaft in response to axial displacement of said part toward the collet.

4. The combination of claim 3 wherein said coupling means includes ramp means, and pusher bearing means engageable with the ramp means to effect said axial displacement of said part toward the collet in response to rotation of said rotary actuator member in one direction about said axis.

5. The combination of claim 4 wherein said ramp means is on the rotary actuator member, and including pusher bearing means engaging said ramp means.

6. The combination of claim 4 wherein said ramp means faces the rotary actuator member and including pusher bearing means engaging said ramp means and located between said ramp means and said member.

7. The combination of claim 4 wherein said ramp means includes first ramp means on the actuator member and second ramp means on a part axially spaced from said member, and including pusher bearing means engaging said first and second ramp means.

8. The combination of claim 7 wherein said first ramp means includes multiple ramps circularly spaced about said axis and tapering radially and axially in one direction about said axis, and said second ramp means includes multiple ramps circularly spaced about said axis and tapering radially and axially in the opposite direction about said axis.

9. The combination of claim 4 wherein the carrier includes housing structure about the piston, shaft, collet, part, and ramp means, said actuator member having a crank portion projecting outwardly of the housing to receive force tending to rotate the actuator member.

10. The combination of claim 9 including a caliper arm integral with the carrier to project at the side of a rotary braking disc and brake pad means engageable with the disc opposite from the piston.

11. The combination of claim 1 wherein the carrier includes a housing about the piston and shaft.

12. The combination of claim 11 including a caliper arm integral with the carrier to project at the side of a rotary braking disc and brake pad means engageable with the disc opposite from the piston.

13. The combination of claim 12 including support structure for the carrier, said support structure and carrier defining guideways to accommodate bodily shifting of the carrier and caliper arm in directions generally parallel to the axis of the shaft.

14. The combination of claim 1 including a grip ring on the shaft and having interference fit therewith, and a Belleville spring urging the ring and shaft in an axial direction relatively away from the piston, there being a shoulder engaged by the Belleville spring and adapted to block displacement of the ring in a direction away from the piston, to allow the shaft to be shifted axially relative to the ring.

15. In a braking assembly,
   (a) a component movable in an axial advancement direction to transmit braking force,
   (b) yieldable means for urging said component in an axial retraction direction,
   (c) a spring finger located for deflection to grip and displace said component in said advancement direction, said finger and component having cooperating threading,
   (d) a rotary actuator member, and
   (e) coupling means responsive to braking movement of said member to deflect said spring finger as aforesaid,
   (f) said component defining an axis extending in said direction and being rotatable about said axis, relative to said spring finger, said member extending about said axis and having a central opening extending axially therethrough,
   (g) said component having an end portion exposed through said opening and defining a shoulder located for rotation by a tool to rotate the component about said axis and relative to said spring finger, said rotation accompanied by axial adjustment displacement of said component,
   (h) and a piston to which the component is rotatably coupled.

* * * * *